(12) United States Patent
Liang et al.

(10) Patent No.: US 11,686,616 B2
(45) Date of Patent: Jun. 27, 2023

(54) SINGLE-PHOTON DETECTION APPARATUS AND METHOD COMPRISING A PHASE-REVERSED REFLECTION BRANCH AND A PHASE-UNREVERSED REFLECTION BRANCH

(71) Applicant: HUAWEI TECHNOLOGIES CO., LTD., Shenzhen (CN)

(72) Inventors: Wenye Liang, Shenzhen (CN); Yuping Wu, Shenzhen (CN); Zhengjun Wei, Guangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/671,636

(22) Filed: Feb. 15, 2022

(65) Prior Publication Data

US 2022/0170786 A1 Jun. 2, 2022

Related U.S. Application Data

(63) Continuation of application No. PCT/CN2020/096188, filed on Jun. 15, 2020.

(30) Foreign Application Priority Data

Aug. 16, 2019 (CN) .......................... 201910759057.2

(51) Int. Cl.
*G01J 1/44* (2006.01)
*G01J 1/46* (2006.01)

(52) U.S. Cl.
CPC ............ *G01J 1/46* (2013.01); *G01J 2001/442* (2013.01)

(58) Field of Classification Search
CPC .......... G01J 1/46; G01J 2001/444; G01J 1/44; G01J 2001/442; G01J 2001/4466

(Continued)

(56) References Cited

U.S. PATENT DOCUMENTS

| 8,841,596 B2 * | 9/2014 | Thomas ..................... G01J 1/44 250/214 R |
| 2004/0200950 A1 | 10/2004 | Beausoleil et al. |
| 2005/0058449 A1 | 3/2005 | Ogawa |

FOREIGN PATENT DOCUMENTS

| CN | 1560577 A | 1/2005 |
| CN | 102998008 A | 3/2013 |

(Continued)

OTHER PUBLICATIONS

Z. L. Yuan et al., High speed single photon detection in the near infrared. Applied Physics Letters 91, 041114 (2007), 11 pages.

(Continued)

*Primary Examiner* — Que Tan Le
(74) *Attorney, Agent, or Firm* — Rimon PC

(57) ABSTRACT

This application provides a single-photon detection apparatus that includes a phase-reversed reflection branch, a single-photon sensing device, a phase-unreversed reflection branch. An input signal is divided into a first and a second input signals, and the two input signals respectively arrive at the phase-reversed reflection branch and the single-photon sensing device. The phase-reversed reflection branch is configured to perform phase-reversed reflection processing on the first input signal, to obtain a phase-reversed signal. The single-photon sensing device is configured to send the second input signal to the phase-unreversed reflection branch, and is further configured to sense a photon, generate photon information, and output a first branch signal. The phase-unreversed reflection branch is configured to perform phase-unreversed reflection processing on the second input signal to obtain a second branch signal. The first branch signal is superimposed with the second branch signal, to obtain the photon information.

20 Claims, 8 Drawing Sheets

(58) Field of Classification Search
USPC .......................................... 250/214 R, 214.1
See application file for complete search history.

(56) References Cited

FOREIGN PATENT DOCUMENTS

| | | |
|---|---|---|
| CN | 202974453 U | 6/2013 |
| CN | 104697646 A | 6/2015 |
| CN | 204535861 U | 8/2015 |
| CN | 106092339 A | 11/2016 |
| CN | 106482840 A | 3/2017 |
| CN | 107024288 A | 8/2017 |
| CN | 107063452 A | 8/2017 |
| CN | 107167251 A | 9/2017 |
| CN | 107505056 A | 12/2017 |
| CN | 107806931 A | 3/2018 |
| CN | 208109268 U | 11/2018 |
| EP | 2333843 A1 | 6/2011 |
| JP | 2003243694 A | 8/2003 |
| WO | 2018232575 A1 | 12/2018 |

OTHER PUBLICATIONS

An Autocompensating Fiber-Optic Quantum Cryptography System Based on Polarization Splitting of Light. IEEE Journal of Quantum Electronics, vol. 36, No. 3, Mar. 2000, 8 pages.

* cited by examiner

SINGLE-PHOTON DETECTION APPARATUS AND METHOD COMPRISING A PHASE-REVERSED REFLECTION BRANCH AND A PHASE-UNREVERSED REFLECTION BRANCH

CROSS-REFERENCE TO RELATED APPLICATIONS

This application is a continuation of International Application No. PCT/CN2020/096188, filed on Jun. 15, 2020, which claims priority to Chinese Patent Application No. 201910759057.2, filed on Aug. 16, 2019. The disclosures of the aforementioned applications are hereby incorporated by reference in their entireties.

TECHNICAL FIELD

Embodiments of this application relate to the field of low light detection technologies, and in particular, to a single-photon detection apparatus and method.

BACKGROUND

The optical sensing and measurement field relates to measurement of a low light signal, and in particular, to measurement that may be performed on an optical signal of a single-photon magnitude. Therefore, there is a need for a single-photon detector.

Currently, a main control method for the single-photon detector is to utilize a gate drive circuit. First, in a gate time window, a bias voltage is increased above an avalanche voltage in a short period of time, so that a single-photon sensing device is in an avalanche mode only within the gate time window. Then, the single-photon sensing device generates a response signal for an incident photon in the gate time window. Finally, the response signal is extracted, to implement single-photon detection. In a single-photon detection process, a dark count rate is an important index to evaluate performance of the single-photon detector, and directly determines a signal-to-noise ratio of signal detection during single-photon detection. Any technology that can be used to reduce the dark count rate of the single-photon detector has important impact on application of the single-photon detector. However, in a gated signal period, two forward pulses sequentially pass through a single-photon detector running in a Geiger mode in a conventional technology, and an additional backward pulse is added, so that a quantity of dark counts is increased, and sensitivity of the single-photon detector is reduced.

SUMMARY

Embodiments of this application provide a single-photon detection apparatus and method, to reduce a quantity of dark counts during single-photon detection, and resolve a problem of low sensitivity of a single-photon detector.

According to a first aspect, an embodiment of this application provides a single-photon detection apparatus, including: a phase-reversed reflection branch, a single-photon sensing device, and a phase-unreversed reflection branch, where an input signal is divided into a first input signal that is received at the phase-reversed reflection branch and a second input signal that is received at the single-photon sensing device; the phase-reversed reflection branch is configured to: perform phase-reversed reflection processing on the first input signal, to obtain a phase-reversed signal, and send the phase-reversed signal to the single-photon sensing device; the single-photon sensing device is configured to send the second input signal to the phase-unreversed reflection branch, and is further configured to: sense a photon, generate photon information, and output a first branch signal, where the first branch signal includes the photon information and the phase-reversed signal; the phase-unreversed reflection branch is configured to perform phase-unreversed reflection processing on the second input signal, to obtain a second branch signal; and the first branch signal is superimposed with the second branch signal, to obtain the photon information.

In this possible design, phase-reversed reflection means that at a reflection point, there is a phase difference of 180 degrees between a reflected signal and an incident signal. A pulse signal is used as an example. Pulse inversion means that a positive pulse becomes a negative pulse.

In this possible design, in-phase reflection means that at the reflection point, there is a phase difference of 0 degrees between the reflected signal and the incident signal.

In this possible design, the input signal is divided into the first input signal and the second input signal, the first input signal passes through the phase-reversed reflection branch, and the second input signal passes through the single-photon sensing device. Phase-reversed processing is performed on the first input signal that passes through the phase-reversed reflection branch (in other words, the signal output by the phase-reversed reflection branch is opposite to the input signal), to obtain the phase-reversed signal. Because the phase-reversed signal and the first input signal have opposite polarities, two pulses with different polarities sequentially pass through a single-photon detector in a gate time window, and only one of the two pulses enables the single-photon detector to be in a photon detection state. This suppresses generation of an afterpulse and reduces a dark count rate.

In a first possible design of the first aspect, the first branch signal and the second branch signal arrive at an output end at a same time.

In this possible design, the first branch signal and the second branch signal arrive at the output end at the same time. Therefore, after the first branch signal and a second branch signal are superimposed, a residual gated signal and an electrical spike noise brought by the residual gated signal can be eliminated, to obtain the photon information.

In a second possible design of the first aspect, the phase-reversed reflection branch includes a short-circuit resistor and a first capacitor, and the first input signal sequentially pass through the first capacitor and the short-circuit resistor, to generate the phase-reversed signal through reflection.

In a third possible design of the first aspect, the phase-unreversed reflection branch includes an open-circuit resistor and a second capacitor, and after the second input signal pass through the single-photon sensing device sequentially pass through the second capacitor and the open-circuit resistor, the second branch signal is generated through reflection.

In this possible design, the first capacitor and the second capacitor are disposed in the phase-reversed reflection branch and the phase-unreversed reflection branch, so that impedance of the first branch matches impedance of the second branch. In this circuit design manner, the residual gated signal in the first branch signal and the second branch signal and the electrical spike noise introduced by the gated signal can be effectively eliminated, thereby improving quality of the photon information, and improving accuracy of the single-photon detection apparatus.

In a fourth possible design of the first aspect, the input signal is obtained by coupling a gated signal and a bias voltage signal.

In this possible design, coupling processing is performed on the gated signal and a preset bias voltage signal, to obtain the input signal. Because the input signal is a signal obtained through coupling processing, difficulty in matching impedance of the first branch circuit and impedance of the second branch circuit can be reduced.

According to the fourth possible design of the first aspect, in a fifth possible design of the first aspect, the apparatus may further include a third capacitor and a first inductor, a first end of the third capacitor is configured to receive the gated signal, a second end of the third capacitor is separately connected to an end of the phase-reversed reflection branch, a first end of the first inductor, and an end of the single-photon sensing device, and a second end of the first inductor is configured to receive the bias voltage signal.

In this possible design, the gated signal that passes through the third capacitor and the bias voltage signal that passes through the first inductor are coupled to form an input signal. The input signal is divided into the first input signal and the second input signal. After the first input signal passes through the phase-reversed reflection branch, the phase-reversed signal is output. After the phase-reversed signal passes through the single-photon sensing device, the first branch signal is obtained. The second input signal passes through the single-photon sensing device, and then enters the phase-unreversed reflection branch. The phase-unreversed reflection branch outputs the second branch signal. After the gated signal passes through the third capacitor, the gated signal is superimposed with the bias voltage signal that passes through the first inductor, so that some noise signals in the gated signal and the bias voltage signal can be filtered out, to facilitate matching of the impedance of the first branch and the impedance of the second branch.

In a sixth possible design of the first aspect, the input signal is a gated signal.

According to the sixth possible design of the first aspect, in a seventh possible design of the first aspect, the phase-reversed reflection branch may include a short-circuit resistor, and the input signal sequentially passes through the short-circuit resistor, to generate the phase-reversed signal through reflection.

According to the sixth possible design of the first aspect, in an eighth possible design of the first aspect, the phase-unreversed reflection branch includes an open-circuit resistor and a second capacitor, and after the first input signal passes through the single-photon sensing device sequentially pass through the second capacitor and the open-circuit resistor, to generate the second branch signal through reflection.

According to any one of the sixth to the eighth possible designs of the first aspect, in a ninth possible design of the first aspect, the apparatus may further include a third capacitor and a first inductor, aa first end of the third capacitor is configured to receive the phase-reversed signal and the gated signal, a second end of the third capacitor is connected to the single-photon sensing device, a first end of the first inductor is connected to the single-photon sensing device, and a second end of the first inductor is configured to receive a bias voltage signal.

In this possible design, input signals including the gated signals are divided into a first input signal and a second input signal. After the first input signal passes through the phase-reversed reflection branch, the phase-reversed signal is output. The phase-reversed signal that passes through the third capacitor and the single-photon sensing device and the bias voltage signal that acts on the single-photon sensing device form the first branch signal. The second input signal that passes through the third capacitor and the single-photon sensing device and the bias voltage signal that acts on the single-photon sensing device are superimposed, and then a signal obtained through superimposition enters the phase-unreversed reflection branch. The phase-unreversed reflection branch outputs the second branch signal.

According to any one of the sixth to the eighth possible designs of the first aspect, in a tenth possible design of the first aspect, the apparatus may further include a third capacitor and a first inductor, a first end of the third capacitor is configured to receive the phase-reversed signal and the gated signal, a second end of the third capacitor is separately connected to the single-photon sensing device and a first end of the first inductor, and a second end of the first inductor is configured to receive the bias voltage signal.

In this possible design, input signals including the gated signals are divided into a first input signal and a second input signal. After the first input signal passes through the phase-reversed reflection branch, the phase-reversed signal is output. The phase-reversed signal that passes through the third capacitor and the bias voltage signal are superimposed, and then a signal obtained through superimposition enters the single-photon sensing device. The single-photon sensing device outputs the first branch signal. The second input signal that passes through the third capacitor and the bias voltage signal are superimposed, and then signals obtained through superimposition sequentially enter the single-photon sensing device and the phase-unreversed reflection branch. The phase-unreversed reflection branch outputs the second branch signal.

According to any one of the fourth, the fifth, and the ninth possible designs of the first aspect, in an eleventh possible design of the first aspect, the bias voltage signal is used to control the single-photon sensing device to be in a critical breakdown state.

It should be noted that a polarity is not changed when the bias voltage signal passes through the phase-unreversed reflection branch and the phase-reversed reflection branch. For example, a positive bias voltage signal is reflected regardless of whether the positive bias voltage signal passes through the phase-unreversed reflection circuit or the phase-reversed reflection circuit. A negative bias voltage signal is reflected regardless of whether the negative bias voltage signal passes through the phase-unreversed reflection circuit or the phase-reversed reflection circuit.

In this possible design, the preset bias voltage signal is used to control the single-photon sensing device to be in the critical breakdown state, so that the single-photon sensing device can sensitively respond to the gated signal. When the gated signal is superimposed with the bias voltage signal, the single-photon sensing device may be in an avalanche state in a time window of the gated signal. When there is a photon in the time window of the gated signal, the single-photon sensing device in the avalanche state can respond to the photon and generate the photon information.

According to any possible design of the first aspect, in a twelfth possible design of the first aspect, a period of time in which the input signal is sent from an input end to the output end is one-half ($\frac{1}{2}$) of a period duration of the gated signal.

According to any possible design of the first aspect, in a thirteenth possible design of the first aspect, when the bias voltage signal acts on a cathode of the single-photon sensing device, the bias voltage signal is a positive bias voltage signal, and the gated signal is a negative pulse signal; or when the bias voltage signal acts on an anode of the single-photon sensing device, the bias voltage signal is a negative bias voltage signal, and the gated signal is a positive pulse signal.

In this possible design, when the bias voltage signal acts on the cathode of the single-photon sensing device, the bias voltage signal is a positive bias voltage signal. When an input gated signal is a negative pulse, an input signal on which a phase-reversed reflection processing is not performed does not trigger the single-photon sensing device to be in the avalanche state, and only an input signal on which a phase-reversed reflection processing is performed triggers the single-photon sensing device to be in the avalanche state. When the input gated signal is a positive pulse, there is just an opposite process. Therefore, in a gate period, only one of the two pulses enables the single-photon detector to be in the photon detection state. This suppresses generation of the afterpulse, reduces a quantity of dark counts, and improves sensitivity of the single-photon detector.

According to any possible design of the first aspect, in a fourteenth possible design of the first aspect, the gated signal includes a square wave signal, a sine signal, and a cosine signal.

In this possible design, each periodic signal such as the square wave signal, the sine signal, or the cosine signal can be used as a gated signal, to trigger the single-photon sensing device to respond to the photon in the gate time window of the gated signal, to obtain the photon information.

According to a second aspect, an embodiment of this application provides a single-photon detection method, including: dividing an input signal into a first input signal and a second input signal; performing phase-reversed reflection processing on the first input signal, to obtain a phase-reversed signal; sensing a photon, generating photon information, and outputting a first branch signal, where the first branch signal includes the photon information and the phase-reversed signal; performing phase-unreversed reflection processing on the second input signal, to obtain a second branch signal; and superimposing the first branch signal and the second branch signal, to obtain the photon information.

In this possible design, the input signal is divided into the first input signal and the second input signal, the first input signal passes through the phase-reversed reflection branch, the second input signal passes through the single-photon sensing device, and phase-reversed processing is performed on the first input signal that passes through the phase-reversed reflection branch (in other words, the signal output by the phase-reversed reflection branch is opposite to the input signal), to obtain the phase-reversed signal. Because the phase-reversed signal and the first input signal have opposite polarities, two pulses with different polarities sequentially pass through a single-photon detector in a gate time window, and only one of the two pulses enables the single-photon detector to be in a photon detection state. This suppresses generation of an afterpulse, reduces a quantity of dark counts, and improves sensitivity of the single-photon detector.

In a first possible design of the second aspect, the first branch signal and the second branch signal arrive at an output end at a same time.

In this possible design, the first branch signal and the second branch signal arrive at the output end at the same time. Therefore, after a first branch and a second branch are superimposed, an electrical spike noise can be eliminated, to obtain the photon information.

In a second possible design of the second aspect, the performing phase-reversed reflection processing on one input signal, to obtain a phase-reversed signal includes: inputting the input signal into a phase-reversed reflection branch that includes a first capacitor and a short-circuit resistor, to obtain the phase-reversed signal.

In a third possible design of the second aspect, the performing phase-unreversed reflection processing on the second input signal, to obtain a second branch signal includes: sequentially inputting, into a phase-unreversed reflection branch that includes a second capacitor and an open-circuit resistor, the second input signal passes through a single-photon sensing device, to generate the second branch signal through reflection.

In this possible design, phase-reversed reflection means that at a reflection point, there is a phase difference of 180 degrees between a reflected signal and an incident signal. A pulse signal is used as an example. Pulse inversion means that a positive pulse becomes a negative pulse.

In this possible design, in-phase reflection means that at the reflection point, there is a phase difference of 0 degrees between the reflected signal and the incident signal.

In this possible design, the first capacitor and the second capacitor are disposed in the phase-reversed reflection branch and the phase-unreversed reflection branch, so that impedance of the first branch matches impedance of the second branch. In this circuit design manner, a residual gated signal in the first branch signal and the second branch signal and an electrical spike noise brought by the gated signal can be effectively eliminated, thereby improving quality of the photon information and improving accuracy of a single-photon detection apparatus.

In a fourth possible design of the second aspect, the input signal is obtained by coupling a gated signal and a bias voltage signal.

In this possible design, a gated signal that passes through a third capacitor and a bias voltage signal that passes through a first inductor are coupled to form an input signal. The input signal is divided into the first input signal and the second input signal. After the first input signal passes through the phase-reversed reflection branch, a phase-reversed signal is output. After the phase-reversed signal passes through the single-photon sensing device, the first branch signal is obtained. The second input signal passes through the single-photon sensing device, and then enters the phase-unreversed reflection branch. The phase-unreversed reflection branch outputs the second branch signal.

In this possible design, coupling processing is performed on the gated signal and a preset bias voltage signal, to obtain the input signal. Because the input signal is a signal obtained through coupling processing, difficulty in matching impedance of the first branch circuit and impedance of the second branch circuit can be reduced.

In a fifth possible design of the second aspect, the input signal is a gated signal.

According to the fifth possible design of the second aspect, in a sixth possible design of the second aspect, the performing phase-reversed reflection processing on the first input signal, to obtain a phase-reversed signal includes: inputting the input signal into a phase-reversed reflection branch that includes a short-circuit resistor, to obtain the phase-reversed signal.

According to the fifth possible design of the second aspect, in a seventh possible design of the second aspect, the performing phase-unreversed reflection processing on the second input signal, to obtain a second branch signal includes: superimposing the second input signal that passes through a third capacitor and a single-photon sensing device and a bias voltage signal that acts on the single-photon sensing device, and inputting a signal obtained through superimposition into the phase-unreversed reflection branch, where the phase-unreversed reflection branch outputs the second branch signal; or superimposing the second input signal that passes through the third capacitor and the bias voltage signal, and sequentially inputting signals obtained through superimposition into the single-photon sensing device and the phase-unreversed reflection branch, where the phase-unreversed reflection branch outputs the second branch signal.

In this possible design, input signals including the gated signals are divided into the first input signal and the second input signal. After the first input signal passes through the phase-reversed reflection branch, the phase-reversed signal is output. The phase-reversed signal that passes through the third capacitor and the single-photon sensing device and the bias voltage signal that acts on the single-photon sensing device form the first branch signal. The second input signal that passes through the third capacitor and the single-photon sensing device and the bias voltage signal that acts on the single-photon sensing device are superimposed, and then a signal obtained through superimposition enters the phase-unreversed reflection branch. The phase-unreversed reflection branch outputs the second branch signal. Alternatively, input signals including the gated signals are divided into the first input signal and the second input signal. After the first input signal passes through the phase-reversed reflection branch, the phase-reversed signal is output. The phase-reversed signal that passes through the third capacitor and the bias voltage signal are superimposed, and then a signal obtained through superimposition enters the single-photon sensing device. The single-photon sensing device outputs the first branch signal. The second input signal that passes through the third capacitor and the bias voltage signal are superimposed, and then signals obtained through superimposition sequentially enter the single-photon sensing device and the phase-unreversed reflection branch. The phase-unreversed reflection branch outputs the second branch signal.

According to the fourth possible design of the second aspect, in an eighth possible design of the second aspect, the bias voltage signal is used to control the single-photon sensing device to be in a critical breakdown state.

In this possible design, the bias voltage signal is used to control the single-photon sensing device to be in the critical breakdown state, so that the single-photon sensing device can sensitively respond to the gated signal. When the gated signal is superimposed with the bias voltage signal, the single-photon sensing device may be in an avalanche state in a time window of the gated signal. When there is a photon in the time window of the gated signal, the single-photon sensing device in the avalanche state can respond to the photon and generate the photon information.

According to any possible design of the second aspect, in a ninth possible design of the second aspect, a period of time in which the input signal is sent from an input end to the output end is one-half (½) of a period duration of the gated signal.

According to any possible design of the second aspect, in a tenth possible design of the second aspect, when the bias voltage signal acts on a cathode of the single-photon sensing device, the bias voltage signal is a positive bias voltage signal, and the gated signal is a negative pulse signal; or when the bias voltage signal acts on an anode of the single-photon sensing device, the bias voltage signal is a negative bias voltage signal, and the gated signal is a positive pulse signal.

In this possible design, when the bias voltage signal acts on the cathode of the single-photon sensing device, the bias voltage signal is a positive bias voltage signal. When the gated signal is a negative pulse, an input signal on which a phase-reversed reflection processing is not performed does not trigger the single-photon sensing device to be in the avalanche state, and only an input signal on which a phase-reversed reflection processing is performed triggers the single-photon sensing device to be in the avalanche state. When the gated signal is a positive pulse, there is just an opposite process. Therefore, in a gate time window, only one of the two pulses enables the single-photon detector to be in the photon detection state. This suppresses generation of the afterpulse, reduces the quantity of dark counts, and improves the sensitivity of the single-photon detector.

According to any possible design of the second aspect, in an eleventh possible design of the second aspect, the gated signal includes a square wave signal, a sine signal, and a cosine signal.

In this possible design, each periodic signal such as the square wave signal, the sine signal, or the cosine signal can be used as a gated signal, to trigger the single-photon sensing device to respond to the photon in the gate time window of the gated signal, to obtain the photon information.

According to a third aspect, an embodiment of this application provides a single-photon detection apparatus, including: a module, a component, or a circuit configured to implement the single-photon detection method in the second aspect.

According to a fourth aspect, an embodiment of this application provides a chip, including a memory and a processor. The memory is configured to store a program instruction, and the processor is configured to invoke the program instruction in the memory, to perform the single-photon detection method according to the embodiment of this application in the second aspect. It should be understood that the processor may be implemented by using a circuit, for example, a dedicated hardware circuit (ASIC).

In this application, in the gate time window, two pulses with different polarities sequentially pass through the single-photon detector, and only one of the two pulses enables the single-photon detector to be in the photon detection state, thereby reducing a generation rate of the afterpulse, reducing the quantity of dark counts, and improving the sensitivity of the single-photon detector.

DESCRIPTION OF EMBODIMENTS

Figure 1:
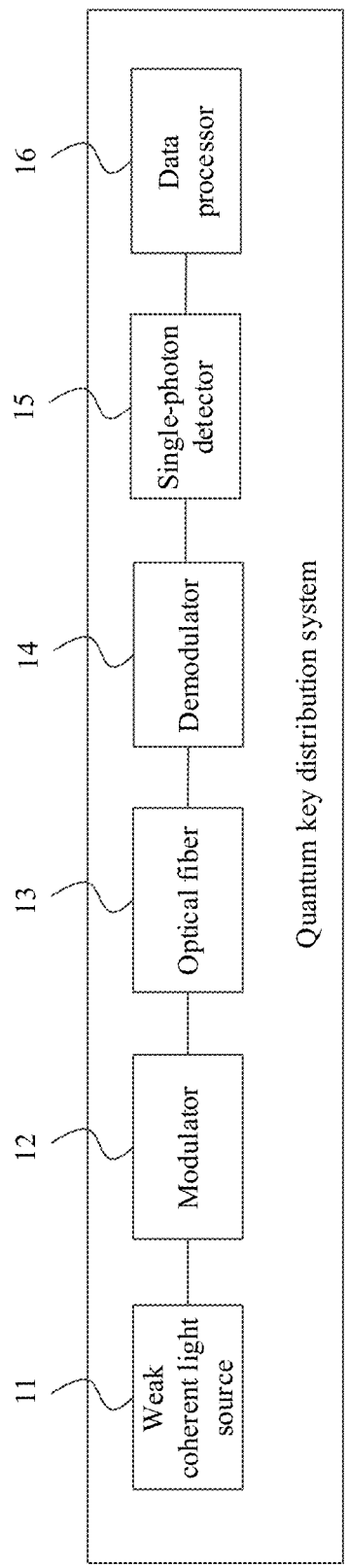
FIG. 1 is a schematic diagram of an application scenario of a single-photon detector, according to an embodiment of this application.

FIG. 1 is a schematic diagram of an application scenario of a single-photon detector according to an embodiment of this application. As shown in FIG. 1, a quantum key distribution (QKD) system includes a weak coherent light source 11, a modulator 12, an optical fiber 13, a demodulator 14, a single-photon detector 15, and a data processor 16. The weak coherent light source 11 is configured to generate a photon, the modulator 12 is configured to adjust a polarization state of the photon, the optical fiber 13 is configured to transmit the photon to the demodulator 14, the demodulator 14 demodulates the photon and then transmits the photon to the single-photon detector 15, and the single-photon detector 15 is configured to: detect photon information, and send the photon information to the data processor 16. The photon information may include information such as a quantity of photons, a photon receiving moment, and a photon receiving location. Performance of the single-photon detector 15 directly affects a final security key rate of the QKD system. A detector with high efficiency and a small quantity of dark count greatly improves performance of the quantum key distribution system and increases the security key rate of the quantum key distribution system.

The following explains some terms in this application to facilitate understanding by a person skilled in the art.

A single-photon sensing device mainly includes an avalanche photodiode (APD) and a peripheral circuit of the single-photon sensing device. When no external circuit interferes with the APD, an avalanche current continues until a bias voltage decreases. In this process, the avalanche photodiode cannot operate for long periods of time, and there is a risk that the avalanche diode may break down and become damaged. Each circuit of an APD single-photon detector completes the following functions: (1) Identification: Accurately identify an avalanche signal, generate a corresponding output signal, and ensure that an additional time jitter is minimized; (2) Quenching: Rapidly reduce the bias voltage, so that the avalanche photodiode is at a non-avalanche voltage for a period of time, to terminate an avalanche process, and avoid accumulation of an excess carrier (e.g., the excess carrier is released); (3) Reset: Restore the bias voltage to a working state in an expedited fashion, so that the APD can respond to a next incident photon.

In a gate time window, a gate drive circuit increases the bias voltage above an avalanche voltage in a short period of time, so that the avalanche photodiode is in an avalanche mode only in the gate time window. Therefore, it may also be considered that "quenching" and "reset" are continuously performed at a fixed repetition frequency. Because an avalanche photodiode driven in a gate mode responds to an incident photon only in the gate time window, a detection gate usually needs to be phase-synchronized with a triggering frequency of a signal source, to ensure that signal light falls within a time window of the detection gate.

The following describes a single-photon detection apparatus and method in this application in detail by using embodiments. It should be noted that the following several embodiments may be combined with each other. Same or similar content is not described repeatedly in different embodiments.

Figure 2:
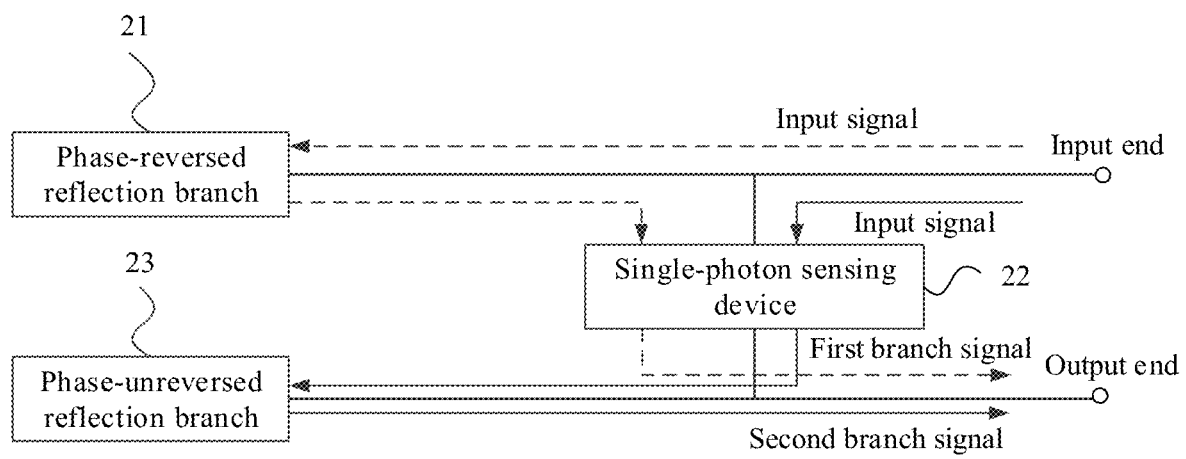
FIG. 2 is a schematic structural diagram of a single-photon detection apparatus, according to an embodiment of this application.

FIG. 2 is a schematic structural diagram of a single-photon detection apparatus according to an embodiment of this application. As shown in FIG. 2, the apparatus in some embodiments may include a phase-reversed reflection branch 21, a single-photon sensing device 22, and a phase-unreversed reflection branch 23. An input signal is divided into two input signals, and the two input signals respectively arrive at the phase-reversed reflection branch 21 and the single-photon sensing device 22; the phase-reversed reflection branch 21 is configured to: perform phase-reversed reflection processing on a received input signal, to obtain a phase-reversed signal, and send the phase-reversed signal to the single-photon sensing device 22; the single-photon sensing device 22 is configured to send a received input signal to the phase-unreversed reflection branch 23, and is further configured to: sense a photon, generate photon information, and output a first branch signal, where the first branch signal includes the photon information and the phase-reversed signal; the phase-unreversed reflection branch 23 is configured to perform phase-unreversed reflection processing on the input signal that passes through the single-photon sensing device, to obtain a second branch signal; and the first branch signal is superimposed with the second branch signal, to obtain the photon information.

In these embodiments, the input signal is divided into the two input signals, one input signal passes through the phase-reversed reflection branch 21, the other input signal passes through the single-photon sensing device 22, and phase-reversed processing is performed on the input signal that passes through the phase-reversed reflection branch 21 (in other words, the signal output by the phase-reversed reflection branch has a polarity opposite to that of the input signal), to obtain the phase-reversed signal. When the phase-reversed signal acts on the single-photon sensing device 22, the single-photon sensing device 22 is in a working state, and is configured to: respond to an incident photon, generate the photon information, and obtain the first branch signal including the photon information. A polarity of the other input signal that passes through the single-photon sensing device 22 is opposite to a polarity of the phase-reversed signal. Therefore, when the input signal acts on the single-photon sensing device 22, the single-photon sensing device 22 does not work. Phase-unreversed reflection processing is performed on the input signal that passes through the single-photon sensing device 22 (in other words, a polarity of an output signal of the phase-unreversed reflection branch is the same as that of the input signal), to obtain the second branch signal. Because the second branch signal does not include the photon information, the photon information may be obtained after the first branch signal and the second branch signal are superimposed.

It should be noted that the single-photon sensing device 22 is provided with a port for receiving the photon, and the photon enters the single-photon sensing device 22 through the port. When the single-photon sensing device 22 is in the working state, and the photon enters the single-photon sensing device 22 through the port, the single-photon sensing device 22 senses the photon and generates the photon information. A specific type of a photon generator that is electrically connected to the single-photon sensing device and a connection relationship between the photon generator and the single-photon sensing device are not limited in these embodiments.

For example, the single-photon sensing device 22 may be a single-photon detection device such as an avalanche photodiode (APD).

In some embodiments, because the phase-reversed signal and the input signal have opposite polarities, two pulses with different polarities sequentially pass through the single-photon detector in a gate time window, and only one of the two pulses enables the single-photon detector to be in a photon detection state. This suppresses generation of an afterpulse, reduces a quantity of dark counts, and improves sensitivity of the single-photon detector.

For example, the first branch signal and the second branch signal arrive at an output end at a same time.

In some embodiments, the first branch signal and the second branch signal arrive at the output end at the same time. Therefore, after a first branch and a second branch are superimposed, an electrical spike noise can be eliminated, to obtain only the photon information.

For example, a period of time in which the input signal is sent from an input end to the output end may be set to be one-half (½) of the period duration of a gated signal.

In some embodiments, the period of time in which the input signal is sent from the input end to the output end is set to be one-half (½) of the period duration of the gated signal. In this manner, a time window of the gated signal can be fully used, so that photon counting can be completed in the time window of the gated signal, and miscount can be avoided.

In some embodiments, in the gate time window, the two pulses with different polarities sequentially pass through the single-photon detector, and only one of the two pulses enables the single-photon detector to be in the photon detection state. This suppresses the generation of the afterpulse, reduces the quantity of dark counts, and improves the sensitivity of the single-photon detector.

Figure 3:
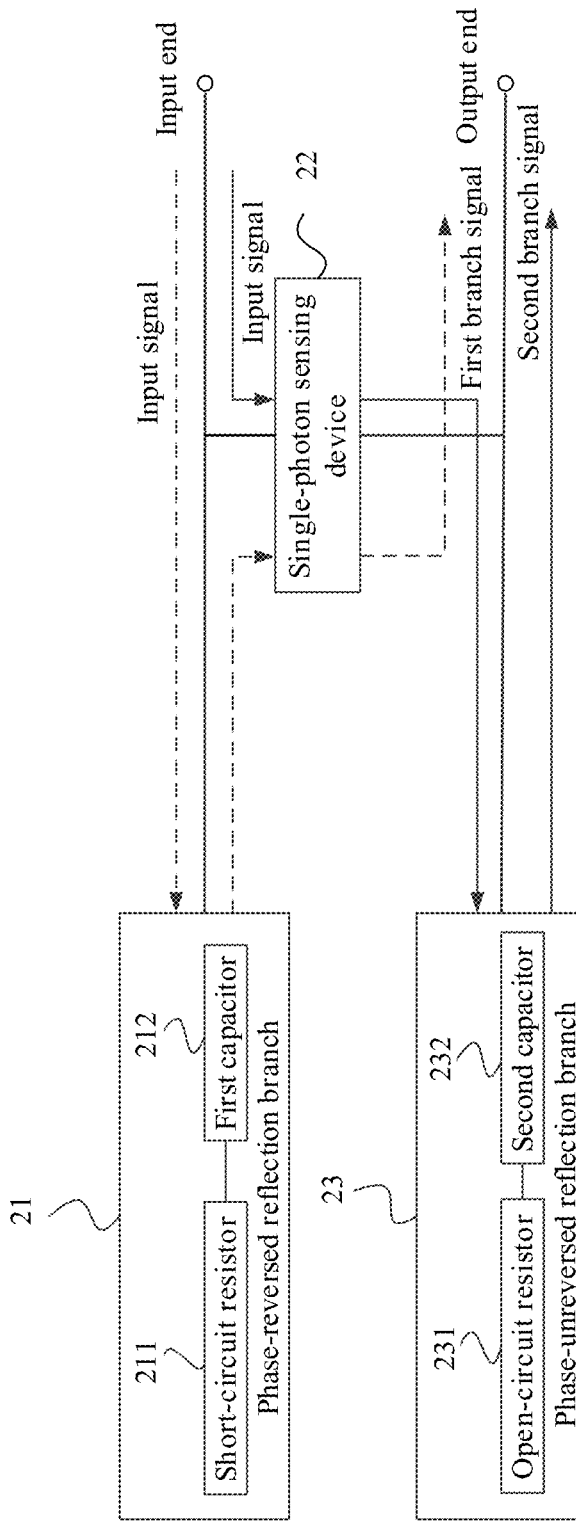
FIG. 3 is a schematic structural diagram of a single-photon detection apparatus, according to another embodiment of this application.

FIG. 3 is a schematic structural diagram of a single-photon detection apparatus according to another embodiment of this application. As shown in FIG. 3, the apparatus in these embodiments may include a phase-reversed reflection branch 21, a single-photon sensing device 22, and a phase-unreversed reflection branch 23. An input signal is divided into two input signals, and the two input signals respectively arrive at the phase-reversed reflection branch 21 and the single-photon sensing device 22; the phase-reversed reflection branch 21 is configured to: perform phase-reversed reflection processing on a received input signal, to obtain a phase-reversed signal, and send the phase-reversed signal to the single-photon sensing device 22; the single-photon sensing device 22 is configured to send a received input signal to the phase-unreversed reflection branch 23, and is further configured to: sense a photon, generate photon information, and output a first branch signal, where the first branch signal includes the photon information and the phase-reversed signal; the phase-unreversed reflection branch 23 is configured to perform phase-unreversed reflection processing on the input signal that passes through the single-photon sensing device, to obtain a second branch signal; and the first branch signal is superimposed with the second branch signal, to obtain the photon information. The phase-reversed reflection branch 21 includes a short-circuit resistor 211 and a first capacitor 212. After input signals sequentially pass through the first capacitor 212 and the short-circuit resistor 211, the phase-reversed signal is generated through reflection. The phase-unreversed reflection branch 23 includes an open-circuit resistor 231 and a second capacitor 232. After input signals that pass through the single-photon sensing device 22 sequentially pass through the second capacitor 232 and the open-circuit resistor 231, the second branch signal is generated through reflection.

In some embodiments, the first capacitor 212, the second capacitor 232, the short-circuit resistor 211, and the open-circuit resistor 231 are disposed in the phase-reversed reflection branch 21 and the phase-unreversed reflection branch 23, so that the single-photon sensing device 22 is prevented from being short-circuited, and impedance of a first branch matches impedance of a second branch. In this circuit design manner, a residual gated signal in the first branch signal and the second branch signal and an electrical spike noise brought by the gated signal can be effectively eliminated, thereby improving quality of the photon information and improving accuracy of the single-photon detection apparatus. It may be understood that the open-circuit resistor has infinite impedance. For example, a wire is disconnected. It may be understood that the short-circuit resistor has zero impedance. There are a plurality of implementations. This is not limited in this application.

For example, the first capacitor 212 and the short-circuit resistor 211 may be connected by using a cable, and the open-circuit resistor 231 and the second capacitor 232 may be connected by using a cable. A type of the cable is not limited in these embodiments, and a coaxial cable or another cable may be used. The cables have a same length, to control a signal to have a basically same delay time in the phase-reversed reflection branch and the phase-unreversed reflection branch.

For example, each period of time in which the input signal is sent from an input end to an output end is less than the period duration of a gated signal.

In some embodiments, each period of time in which the input signal is sent from the input end to the output end is set to be less than the period duration of the gated signal, so that photon counting is completed in a time window of the gated signal, and miscount can be avoided.

For example, the period of time in which the input signal is sent from the input end to the output end may be set to be one-half (½) of the period duration of the gated signal.

In some embodiments, the period of time in which the input signal is sent from the input end to the output end is set to be one-half (½) of the period duration of the gated signal. In this manner, the time window of the gated signal can be fully used, so that the photon counting can be completed in the time window of the gated signal, and miscount can be avoided.

In some embodiments, in a gate time window, two pulses with different polarities sequentially pass through a single-photon detector, and only one of the two pulses enables the single-photon detector to be in a photon detection state. This suppresses generation of afterpulses, reduces a quantity of dark counts, and improves sensitivity of the single-photon detector.

Figure 4:
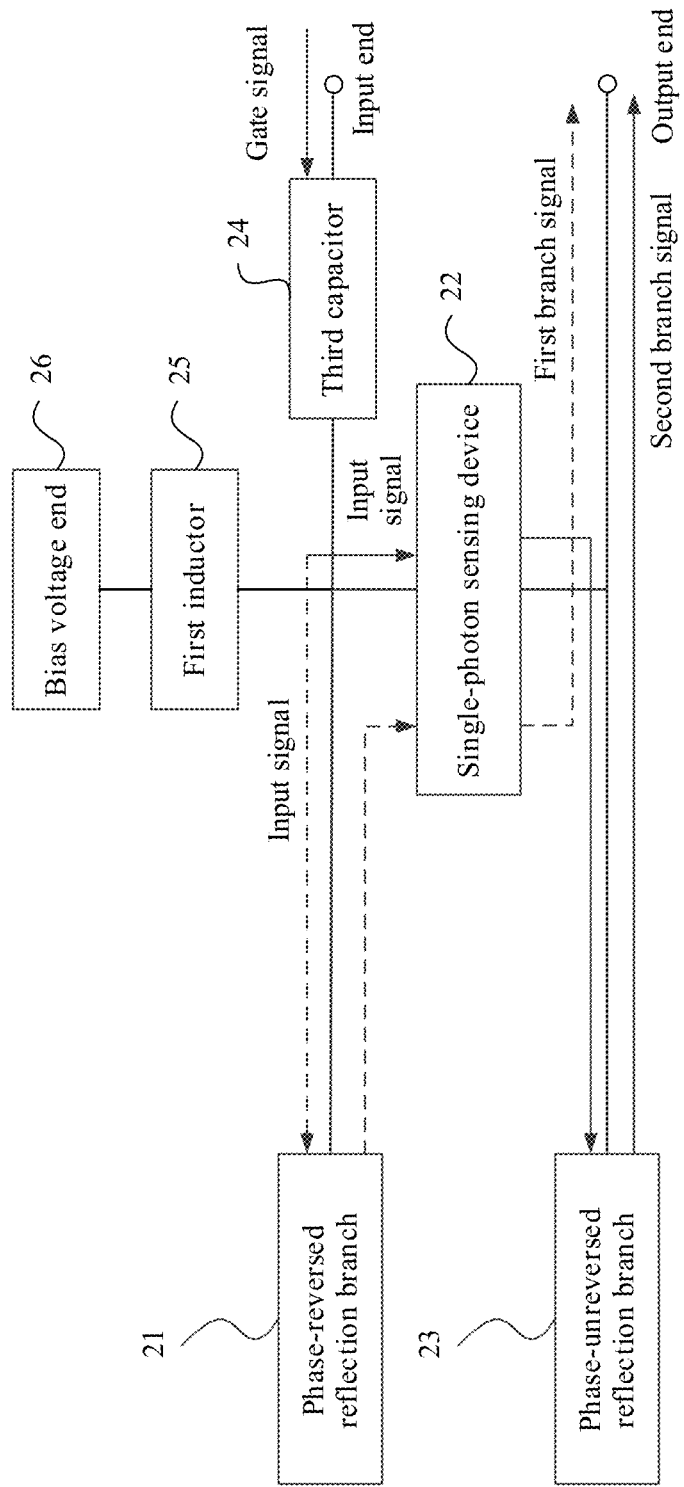
FIG. 4 is a schematic structural diagram of a single-photon detection apparatus, according to still another embodiment of this application.

FIG. 4 is a schematic structural diagram of a single-photon detection apparatus according to still another embodiment of this application. As shown in FIG. 4, the apparatus in this embodiment may include a phase-reversed reflection branch 21, a single-photon sensing device 22, and a phase-unreversed reflection branch 23. An input signal is divided into two input signals, and the two input signals respectively arrive at the phase-reversed reflection branch 21 and the single-photon sensing device 22; the phase-reversed reflection branch 21 is configured to: perform phase-reversed reflection processing on a received input signal, to obtain a phase-reversed signal, and send the phase-reversed signal to the single-photon sensing device 22; the single-photon sensing device 22 is configured to send a received input signal to the phase-unreversed reflection branch 23, and is further configured to: sense a photon, generate photon information, and output a first branch signal, where the first branch signal includes the photon information and the phase-reversed signal; the phase-unreversed reflection branch 23 is configured to perform a phase-unreversed reflection processing on the input signal that passes through the single-photon sensing device, to obtain a second branch signal; and the first branch signal is superimposed with the second branch signal, to obtain the photon information. The input signal may be obtained by coupling a gated signal and a bias voltage signal.

For example, refer to FIG. 4. The apparatus may further include a third capacitor 24 and a first inductor 25. One end of the third capacitor 24 is configured to receive the gated signal, the other end of the third capacitor 24 is separately connected to one end of the phase-reversed reflection branch 21, one end of the first inductor 25, and one end of the single-photon sensing device 22, and the other end of the first inductor 25 is configured to receive the bias voltage signal.

In some embodiments, one end of the third capacitor 24 may be connected to a gated signal transmitter, and the other end of the first inductor may be connected to a bias voltage end 26. The gated signal transmitter is configured to generate the gated signal, and the bias voltage end 26 is configured to apply the bias voltage signal to the single-photon sensing device 22. For example, the bias voltage end 26 may be a voltage source.

It should be noted that, a type of the gated signal transmitter is not limited in some embodiments, and all circuit structures that can generate a gated signal can be applied to these embodiments. A type of a voltage source connected to the bias voltage end 26 is not limited in these embodiments.

In some embodiments, the first inductor and the third capacitor have a function of limiting a signal transmission direction, to prevent a direct current signal of the bias voltage end from arriving at an input end of the gated signal, and avoid the impact of the gated signal and another alternating current signal on the bias voltage end. The gated signal is a periodic signal. After the gated signal passes through the third capacitor, the gated signal is superimposed with the bias voltage signal that passes through the first inductor, so that noise signals in the gated signal and the bias voltage signal may be filtered out, to facilitate matching of the impedance of a first branch and the impedance of a second branch.

For example, the bias voltage signal is used to control the single-photon sensing device 22 to be in a critical breakdown state.

In some embodiments, the bias voltage signal is used to control the single-photon sensing device 22 to be in the critical breakdown state, so that the single-photon sensing device 22 can sensitively respond to the gated signal. When the gated signal is superimposed with the bias voltage signal, the single-photon sensing device may be in an avalanche state in the time window of the gated signal. When there is a photon in the time window of the gated signal, the single-photon sensing device 22 in the avalanche state can respond to the photon and generate the photon information.

For example, when the bias voltage signal acts on a cathode of the single-photon sensing device 22, the bias voltage signal is a positive bias voltage signal; or when the bias voltage signal acts on an anode of the single-photon sensing device 22, the bias voltage signal is a negative bias voltage signal.

In some embodiments, when the input gated signal is a negative pulse signal, the bias voltage signal is a positive bias voltage signal, and the positive bias voltage signal acts on the cathode of the single-photon sensing device 22, so that an input signal on which a phase-reversed reflection processing is not performed does not trigger the single-photon sensing device to be in the avalanche state, and only an input signal on which a phase-reversed reflection processing is performed triggers the single-photon sensing device to be in the avalanche state. Therefore, in a gate time window, only one of the two pulses enables a single-photon detector to be in a photon detection state. This suppresses generation of an afterpulse, reduces a quantity of dark counts, and improves sensitivity of the single-photon detector.

Similarly, when the input gated signal is a positive pulse signal, the bias voltage signal is a negative bias voltage signal, and the negative bias voltage signal acts on the anode of the single-photon sensing device 22, so that the input signal on which a phase-reversed reflection processing is not performed does not trigger the single-photon sensing device to be in the avalanche state, and only the input signal on which a phase-reversed reflection processing is performed triggers the single-photon sensing device to be in the avalanche state. Therefore, in the gate time window, only one of the two pulses enables the single-photon detector to be in the photon detection state. This suppresses generation of afterpulses, reduces the quantity of dark counts, and improves the sensitivity of the single-photon detector.

For example, the gated signal includes a square wave signal, a sine signal, and a cosine signal.

In a possible design, each periodic signal such as the square wave signal, the sine signal, or the cosine signal can be used as a gated signal, to trigger the single-photon sensing device to respond to the photon in the gate time window of the gated signal, to obtain the photon information.

For example, a period of time in which the input signal is sent from the input end to an output end may be set to be one-half (½) of a period duration of the gated signal.

In some embodiments, the period of time in which the input signal is sent from the input end to the output end is set to be one-half (½) of the period duration of the gated signal. In this manner, the time window of the gated signal can be fully used, so that photon counting can be completed in the time window of the gated signal, and miscount can be avoided.

In some embodiments, in the gate time window, two pulses with different polarities sequentially pass through the single-photon detector, and only one of the two pulses enables the single-photon detector to be in the photon detection state. This suppresses generation of the afterpulse, reduces the quantity of dark counts, and improves the sensitivity of the single-photon detector.

Figure 5:
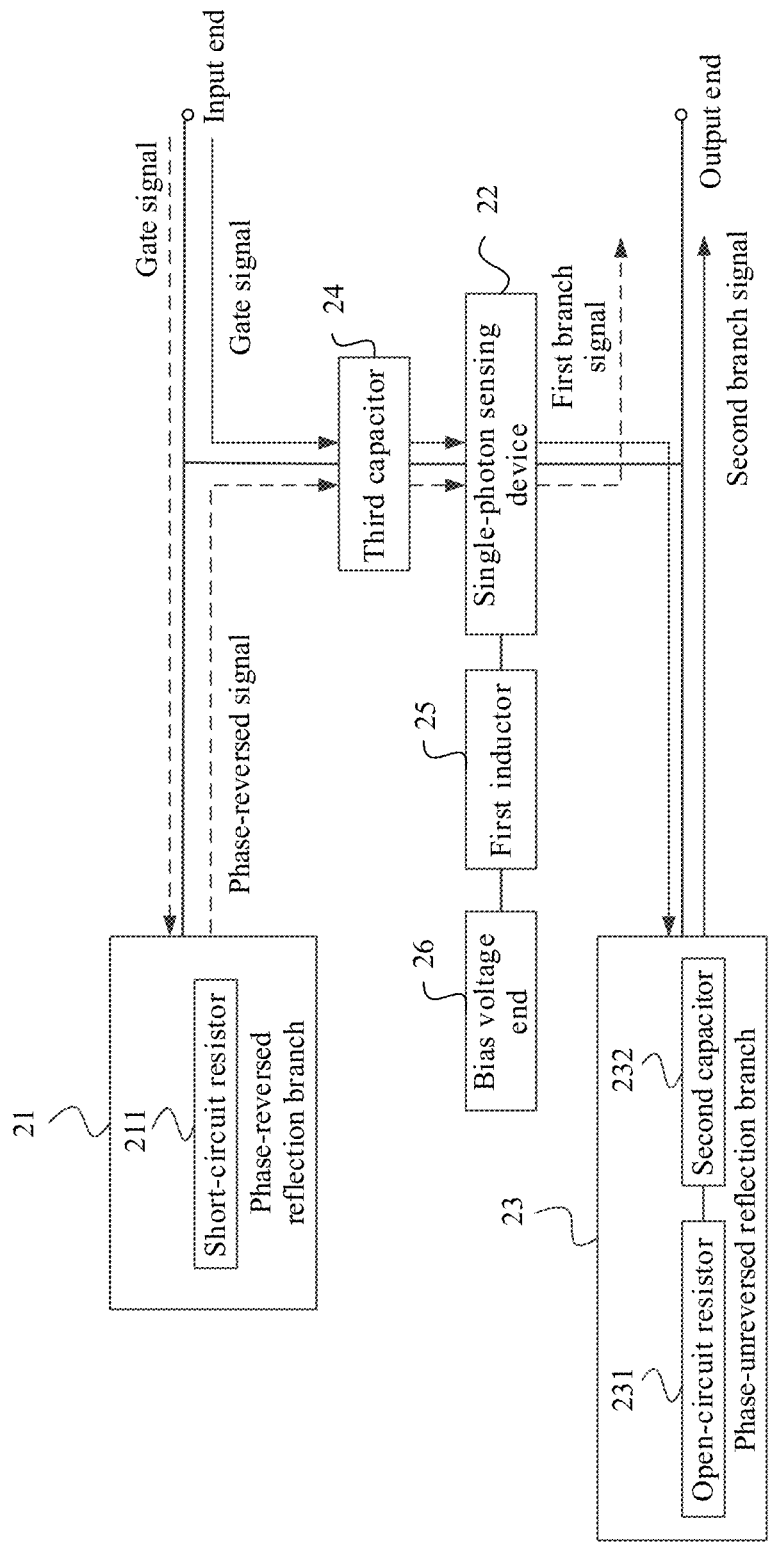
FIG. 5 is a schematic structural diagram of a single-photon detection apparatus, according to yet another embodiment of this application.

FIG. 5 is a schematic structural diagram of a single-photon detection apparatus according to yet another embodiment of this application. As shown in FIG. 5, the apparatus in this embodiment may include a phase-reversed reflection branch 21, a single-photon sensing device 22, and a phase-unreversed reflection branch 23. An input signal is divided into two input signals, and the two input signals respectively arrive at the phase-reversed reflection branch 21 and the single-photon sensing device 22; the phase-reversed reflection branch 21 is configured to: perform phase-reversed reflection processing on a received input signal, to obtain a phase-reversed signal, and send the phase-reversed signal to the single-photon sensing device 22; the single-photon sensing device 22 is configured to send a received input signal to the phase-unreversed reflection branch 23, and is further configured to: sense a photon, generate photon information, and output a first branch signal, where the first branch signal includes the photon information and the phase-reversed signal; the phase-unreversed reflection branch 23 is configured to perform a phase-unreversed reflection processing on the input signal that passes through the single-photon sensing device, to obtain a second branch signal; and the first branch signal is superimposed with the second branch signal, to obtain the photon information. When the input signal is a gated signal, the phase-reversed reflection branch 21 may include a short-circuit resistor 211. After input signals sequentially pass through the short-circuit resistor 211, a phase-reversed signal is generated through reflection. The phase-unreversed reflection branch 23 includes an open-circuit resistor 231 and a second capacitor 232. After input signals that pass through the single-photon sensing device 22 sequentially pass through the second capacitor 232 and the open-circuit resistor 231, the second branch signal is generated through reflection.

In some embodiments, the second capacitor 232, the short-circuit resistor 211, and the open-circuit resistor 231 are disposed in the phase-reversed reflection branch 21 and the phase-unreversed reflection branch 23, so that the single-photon sensing device 22 is prevented from being short-circuited, and the impedance of the first branch matches the impedance of the second branch. In this circuit design manner, an electrical spike noise in the first branch signal and the second branch signal can be effectively eliminated, thereby improving quality of the photon information, and improving accuracy of the single-photon detection apparatus.

In an implementation shown in FIG. 5, the apparatus may further include a third capacitor 24 and a first inductor 25. One end of the third capacitor 24 is configured to receive the gated signal and the phase-reversed signal, and the other end of the third capacitor 24 is connected to the single-photon sensing device 22. One end of the first inductor 25 is connected to the single-photon sensing device 22, and the other end of the first inductor 25 is configured to receive a bias voltage signal. A bias voltage end 26 is connected to a voltage source, and is configured to apply the bias voltage signal to the single-photon sensing device 22.

In some embodiments, input signals including the gated signals are divided into two input signals. After one input signal passes through the phase-reversed reflection branch 21, the phase-reversed signal is output. The phase-reversed signal that passes through the third capacitor 24 and the single-photon sensing device 22 and the bias voltage signal that acts on the single-photon sensing device 22 form the first branch signal. The other input signal that passes through the third capacitor 24 and the single-photon sensing device 22 and the bias voltage signal that acts on the single-photon sensing device 22 are superimposed, and then a signal obtained through superimposition enters the phase-unreversed reflection branch 23. The phase-unreversed reflection branch 23 outputs the second branch signal.

In another implementation, the apparatus may further include a third capacitor 24 and a first inductor 25. One end of the third capacitor 24 is configured to receive the phase-reversed signal and the gated signal, and the other end of the third capacitor 24 is separately connected to one end of the single-photon sensing device 22 and one end of the first inductor 25. The other end of the first inductor 25 is configured to receive a bias voltage signal.

In a possible design, input signals including the gated signals are divided into two input signals. After one input signal passes through the phase-reversed reflection branch 21, the phase-reversed signal is output. The phase-reversed signal that passes through the third capacitor 24 and the bias voltage signal are superimposed, and then a signal obtained through superimposition enters the single-photon sensing device 22. The single-photon sensing device 22 outputs the first branch signal. The other input signal that passes through the third capacitor 24 and the bias voltage signal are superimposed, and then signals obtained through superimposition sequentially enter the single-photon sensing device 22 and the phase-unreversed reflection branch 23. The phase-unreversed reflection branch 23 outputs the second branch signal.

In some embodiments, the gated signal is a periodic signal. After the gated signal passes through the third capacitor, the gated signal is superimposed with the bias voltage signal that passes through the first inductor, so that some noise signals in the gated signal and the bias voltage signal may be filtered out, to facilitate matching of impedance of a first branch and impedance of a second branch.

For example, the bias voltage signal is used to control the single-photon sensing device 22 to be in a critical breakdown state.

In some embodiments, the bias voltage signal is used to control the single-photon sensing device 22 to be in the critical breakdown state, so that the single-photon sensing device 22 can sensitively respond to the gated signal. When the gated signal is superimposed with the bias voltage signal, the single-photon sensing device may be in an avalanche state in a time window of the gated signal. When there is a photon in the time window of the gated signal, the single-photon sensing device 22 in the avalanche state can respond to the photon and generate the photon information.

For example, when the bias voltage signal acts on a cathode of the single-photon sensing device 22, the bias voltage signal is a positive bias voltage signal; or when the bias voltage signal acts on an anode of the single-photon sensing device 22, the bias voltage signal is a negative bias voltage signal.

In some embodiments, when the input gated signal is a negative pulse signal, the bias voltage signal is a positive bias voltage signal, and the positive bias voltage signal acts on the cathode of the single-photon sensing device 22, so that an input signal on which a phase-reversed reflection processing is not performed does not trigger the single-photon sensing device to be in the avalanche state, and only an input signal on which a phase-reversed reflection processing is performed triggers the single-photon sensing device to be in the avalanche state. Therefore, in a gate time window, only one of the two pulses enables a single-photon detector to be in a photon detection state. This suppresses generation of an afterpulse, reduces a quantity of dark counts, and improves sensitivity of the single-photon detector.

Similarly, when the input gated signal is a positive pulse signal, the bias voltage signal is a negative bias voltage signal, and the negative bias voltage signal acts on the anode of the single-photon sensing device 22, so that the input signal on which a phase-reversed reflection processing is not performed does not trigger the single-photon sensing device to be in the avalanche state, and only the input signal on which a phase-reversed reflection processing is performed triggers the single-photon sensing device to be in the avalanche state. Therefore, in the gate time window, only one of the two pulses enables the single-photon detector to be in the photon detection state. This suppresses generation of afterpulses, reduces the quantity of dark counts, and improves the sensitivity of the single-photon detector.

For example, the gated signal includes a square wave signal, a sine signal, and a cosine signal.

In some embodiments, each periodic signal such as the square wave signal, the sine signal, or the cosine signal can be used as a gated signal, to trigger the single-photon sensing device to respond to the photon in the gate time window of the gated signal, to obtain the photon information.

For example, a period of time in which the input signal is sent from an input end to an output end may be set to be one half (½) of the period duration of the gated signal.

In some embodiments, the period of time in which the input signal is sent from the input end to the output end is set to be ½ of the period duration of the gated signal. In this manner, the time window of the gated signal can be fully used, so that photon counting can be completed in the time window of the gated signal, and miscount can be avoided.

In some embodiments, in the gate time window, the two pulses with different polarities sequentially pass through the single-photon detector, and only one of the two pulses enables the single-photon detector to be in the photon detection state. This suppresses generation of afterpulses, reduces the quantity of dark counts, and improves the sensitivity of the single-photon detector.

Figure 6:
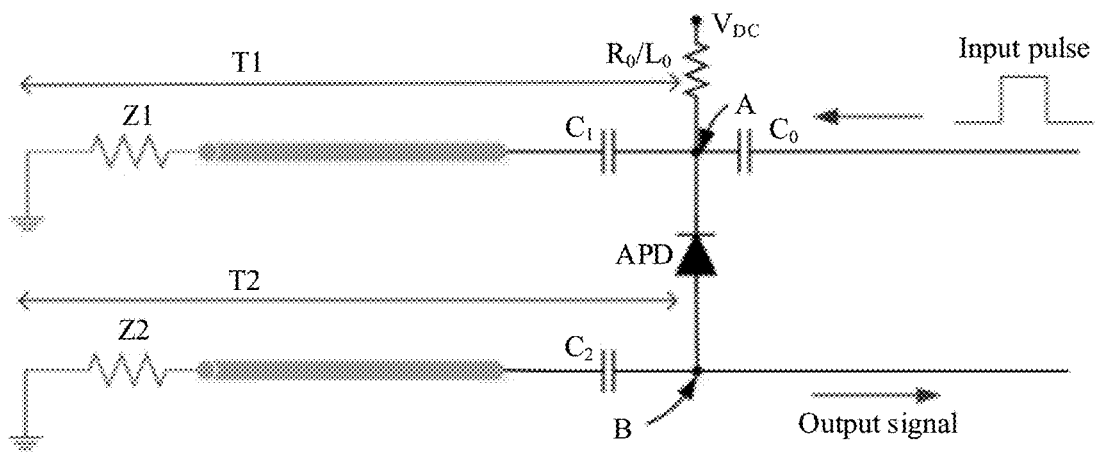
FIG. 6 is a schematic structural diagram of a circuit of a single-photon detection apparatus, according to an embodiment of this application.

FIG. 6 is a schematic structural diagram of a circuit of a single-photon detection apparatus according to an embodiment of this application. As shown in FIG. 6, detailed descriptions are provided by using an example in which an input pulse is a negative pulse and a bias voltage is a positive voltage source. The input pulse first passes through a capacitor $C_0$, and the capacitor $C_0$ is configured to filter out a direct current signal. A bias voltage from a bias voltage end $V_{DC}$ passes through a resistor $R_0$ or an inductor $L_0$, and is then applied to the cathode of an avalanche photodiode (APD). An input pulse signal on which a filtering processing is performed and a bias voltage signal are coupled and superimposed at point A, to obtain an input signal. The input signal is divided into two input signals, and after one of the two input signals sequentially passes through a capacitor $C_1$, a cable, and a short-circuit resistor Z1, a phase-reversed signal with a polarity opposite to that of the input signal is generated. Because the bias voltage end $V_{DC}$ is set as the positive voltage source, the voltage applied by the bias voltage end $V_{DC}$ enables the avalanche photodiode to be in a critical breakdown state. When the phase-reversed signal is input into the APD, the phase-reversed signal causes an avalanche effect in the APD, and when in a state of the avalanche effect, the APD can respond to an incident photon and generate corresponding photon information. Referring to FIG. 6, after the phase-reversed signal passes through the APD, a first branch signal including the photon information is generated. After the other input signal sequentially passes through the APD, a capacitor C2, a cable, and an open-circuit resistor Z2, a second branch signal is generated through reflection. When the bias voltage end $V_{DC}$ is set as the positive voltage source, and an input signal on which a phase-reversed processing is not performed does not cause the avalanche effect when passing through the APD, and the APD does not perform single-photon detection. In this way, the APD works only once in each pulse period, and an afterpulse count rate of the APD is reduced by one.

For example, refer to FIG. 6. T1 indicates the delay duration in which an input signal is sent from point A and reflected back to point A. T2 indicates the delay duration in which an input signal is sent from point B and reflected back to point B. T1 is equal to T2. Usually, the two cables are set to have a same length to control the delay duration. Optionally, to improve a count effect, T1 and T2 may be set to be less than the period duration of the input pulse. For example, it is set that T1=T2=T/2, and T represents the period duration of the input pulse.

For example, in these embodiments, the input pulse signal is a positive pulse, $V_{DC}$ is a negative voltage source, and the voltage of $V_{DC}$ is applied to an anode of the APD. If the input signal is a negative pulse, $V_{DC}$ is a positive voltage source, and the voltage of $V_{DC}$ is applied to a cathode of the APD.

A square pulse signal is used as an example in the figures and the foregoing descriptions of these embodiments. However, a gated signal is not limited to the square pulse gated signal in these embodiments, and a sine signal or another periodic signal can also be used as a gated signal of the APD.

In these embodiments, in a gate time window, two pulses with different polarities sequentially pass through a single-photon detector, and only one of the two pulses enables the single-photon detector to be in a photon detection state. This suppresses generation of an afterpulse, reduces a quantity of dark counts, and improves sensitivity of the single-photon detector.

Figure 7:
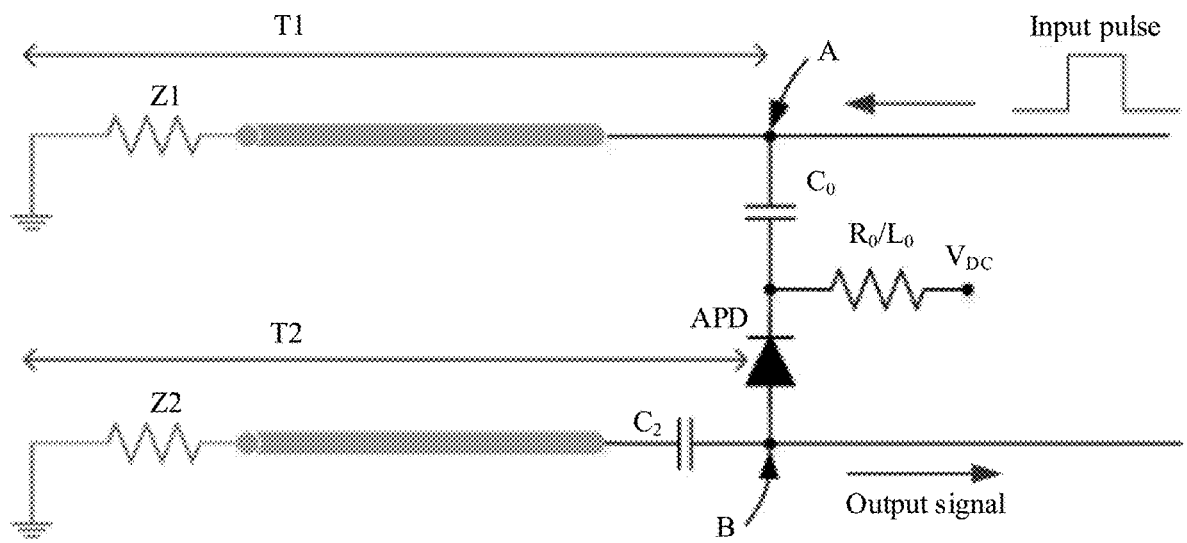
FIG. 7 is a schematic structural diagram of a circuit of a single-photon detection apparatus, according to another embodiment of this application.

FIG. 7 is a schematic structural diagram of a circuit of a single-photon detection apparatus according to another embodiment of this application. As shown in FIG. 7, an input signal (shown as input pulse to the right of point A) is divided into two input pulses at point A. After one of the two input pulses sequentially passes through a cable and a short-circuit resistor, a phase-reversed signal with a polarity opposite to that of the input signal is generated. The phase-reversed signal passes through a capacitor $C_0$, and the capacitor $C_0$ has a function of filtering out a direct current signal. A bias voltage from a bias voltage end $V_{DC}$ passes through a resistor $R_0$ or an inductor $L_0$, and then is applied to a cathode of an avalanche photodiode (APD). An input phase-reversed signal on which filtering processing is performed and a bias voltage signal are superimposed, and a signal obtained through superimposition enters the APD. Because the bias voltage end $V_{DC}$ is set as a positive voltage source, the voltage applied by the bias voltage end $V_{DC}$ enables the avalanche photodiode to be in a critical breakdown state. When the phase-reversed signal is input, the phase-reversed signal causes an avalanche effect of the APD, and when in a state of the avalanche effect, the APD can respond to an incident photon, generate corresponding photon information, and obtain a first branch signal including the photon information. The other one of the two input pulses first passes through the capacitor $C_0$, and the capacitor $C_0$ has the function of filtering out direct current signal. A bias voltage from the bias voltage end $V_{DC}$ passes through the resistor $R_0$ or the inductor $L_0$, and then is applied to the cathode of the APD. An input pulse signal on which filtering processing is performed and a bias voltage signal are superimposed, and a signal obtained through superimposition enters the APD. After signals obtained through superimposition sequentially pass through the APD, a capacitor C2, a cable, and an open-circuit resistor Z2, a second branch signal is generated through reflection. When the bias voltage end $V_{DC}$ is set as the positive voltage source, an input signal on which a phase-reversed processing is not performed does not cause an avalanche effect when passing through the APD, and, the APD does not perform single-photon detection. In this way, the APD works only once in each pulse period, and an afterpulse count rate of the APD is reduced by one.

For example, refer to FIG. 7. T1 indicates a delay duration in which an input signal is sent from point A and reflected back to point A. T2 indicates a delay duration in which an input signal is sent from point B and reflected back to point B. T1 is equal to T2. Usually, the two cables are set to have a same length, to control the delay duration. Optionally, to improve a count effect, T1 and T2 may be set to be less than the period duration of the input pulse. For example, it is set that T1=T2=T/2, and T represents the period duration of the input pulse.

For example, in some embodiments, the input pulse signal is a positive pulse, $V_{DC}$ is a negative voltage source, and the voltage of $V_{DC}$ is applied to the cathode of the APD. If the input signal is a negative pulse, $V_{DC}$ is a positive voltage source, and the voltage of $V_{DC}$ is applied to an anode of the APD.

A square pulse signal is used as an example in the figures and the foregoing descriptions of some embodiments. However, a gated signal is not limited to the square pulse gated signal in some embodiments, and a sine signal or another periodic signal can also be used as a gated signal of the APD.

In some embodiments, in a gate time window, two pulses with different polarities sequentially pass through the single-photon detector, and only one of the two pulses enables the single-photon detector to be in the photon detection state. This suppresses generation of an afterpulse, reduces a quantity of dark counts, and improves sensitivity of the single-photon detector.

Figure 8:
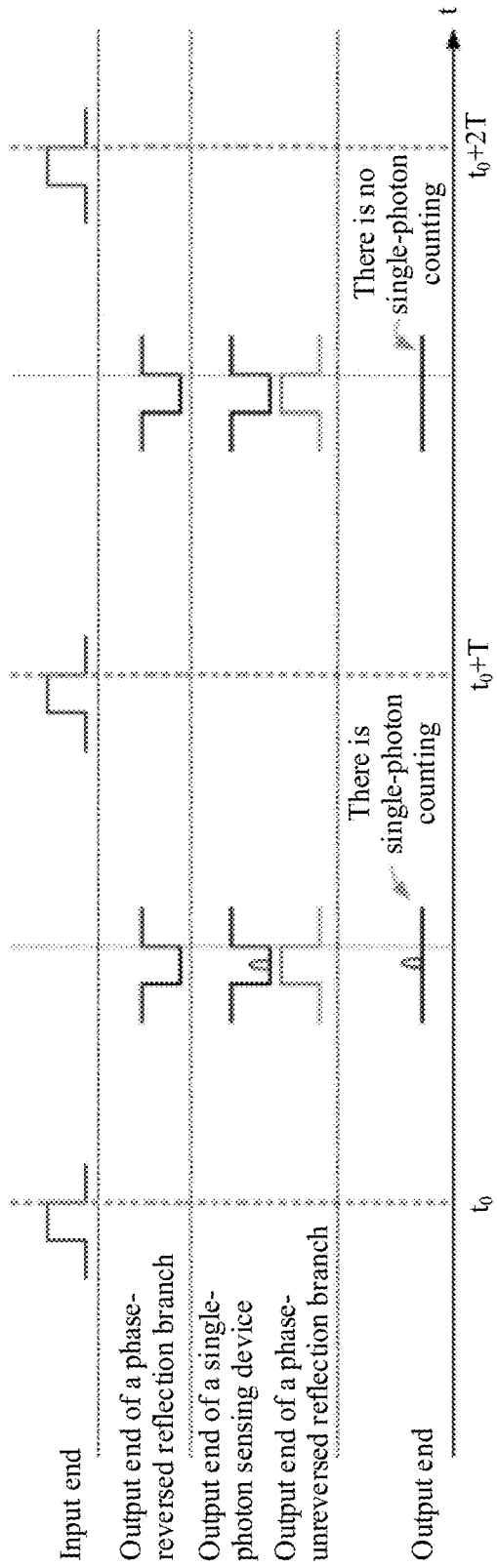
FIG. 8 is a diagram of a signal time sequence of a single-photon detection apparatus, according to an embodiment of this application.

FIG. 8 is a diagram of a signal time sequence of a single-photon detection apparatus according to an embodiment of this application. The diagram of the signal time sequence in FIG. 8 may be applied to the single-photon detection apparatus shown in FIG. 6 and FIG. 7. A square pulse gated signal is used as an example. At a moment $t_0$, a pulse signal is input, and in a time period from $t_0$ to $t_0+T$, there is an incident photon. Therefore, a first branch signal includes photon information. After the first branch signal and the second branch signal are superimposed, the photon information can be obtained. In a time period from $t_0+T$ to $t_0+2T$, there is no incident photon. Therefore, the first branch signal does not include the photon information. After the first branch signal and the second branch signal are superimposed, there is no photon information.

It should be noted that in some embodiments, the square pulse gated signal is used as an example for detailed description. However, a type of a gated signal is not limited in some embodiments. Each periodic signal such as a sine signal or a cosine signal may be used as a gated signal, to trigger a single-photon sensing device to respond to a photon in a gate time window of the gated signal, to obtain the photon information.

Figure 9:
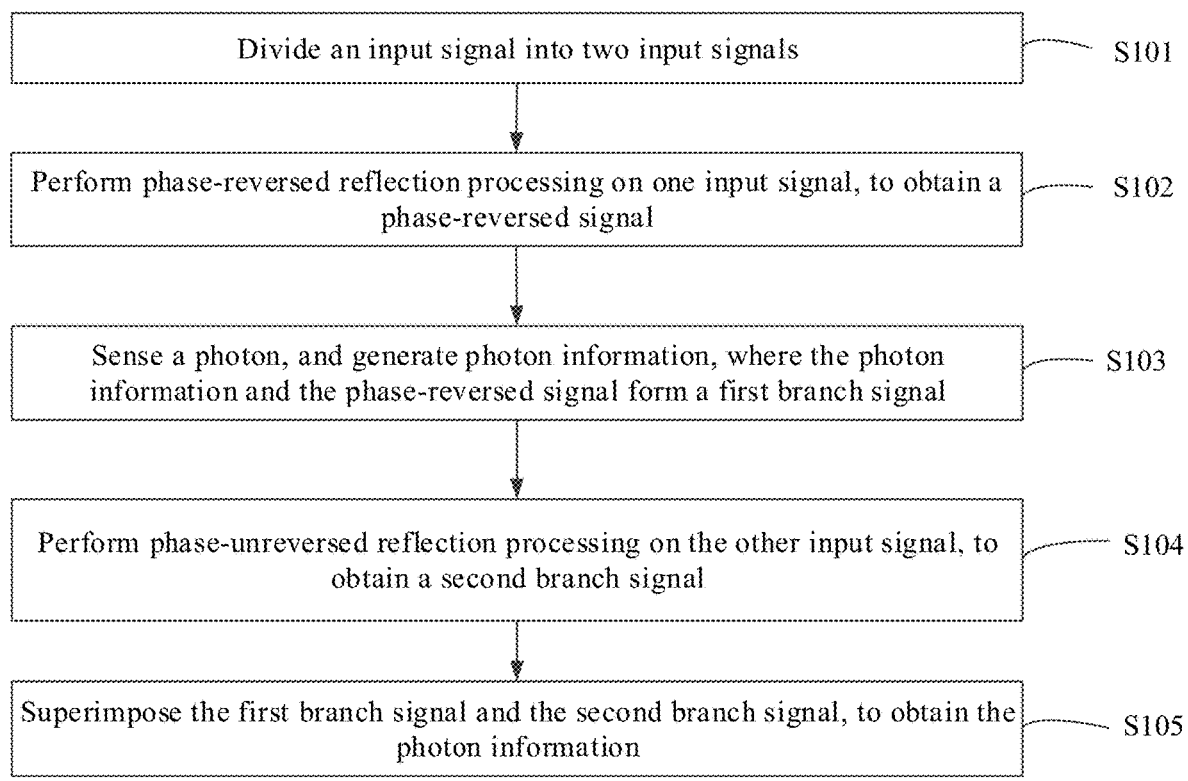
FIG. 9 is a schematic flowchart of a single-photon detection method, according to an embodiment of this application.

FIG. 9 is a schematic flowchart of a single-photon detection method according to an embodiment of this application. As shown in FIG. 9, the method in this embodiment may include the following steps.

S101: Divide an input signal into two input signals.

S102: Perform phase-reversed reflection processing on one input signal, to obtain a phase-reversed signal.

S103: Sense a photon, and generate photon information, where the photon information and the phase-reversed signal form a first branch signal.

S104: Perform phase-unreversed reflection processing on the other input signal, to obtain a second branch signal.

S105: Superimpose the first branch signal and the second branch signal, to obtain the photon information.

In some embodiments, the input signal is divided into the two input signals, one input signal passes through a phase-reversed reflection branch, the other input signal passes through a single-photon sensing device, and phase-reversed processing is performed on the input signal that passes through the phase-reversed reflection branch (in other words, a signal output by the phase-reversed reflection branch is opposite to the input signal), to obtain the phase-reversed signal. Because the phase-reversed signal and the input signal have opposite polarities, two pulses with different polarities sequentially pass through a single-photon detector in a gate time window, and only one of the two pulses enables the single-photon detector to be in a photon detection state. This suppresses generation of an afterpulse, reduces a quantity of dark counts, and improves sensitivity of the single-photon detector.

For example, the first branch signal and the second branch signal arrive at an output end at a same time.

In some embodiments, the first branch signal and the second branch signal arrive at the output end at the same time. Therefore, after a first branch and a second branch are superimposed, an electrical spike noise can be eliminated, to obtain the photon information.

In step S102, the input signal may be input into a phase-reversed reflection branch that includes a first capacitor and a short-circuit resistor, to obtain the phase-reversed signal.

In step S104, input signals that pass through the single-photon sensing device may sequentially pass through a phase-unreversed reflection branch that includes a second capacitor and an open-circuit resistor, to generate the second branch signal through reflection.

In some embodiments, the first capacitor, the second capacitor, the short-circuit resistor, and the open-circuit resistor are disposed in the phase-reversed reflection branch and the phase-unreversed reflection branch, so that the single-photon sensing device is prevented from being short-circuited, and impedance of the first branch matches impedance of the second branch. In this circuit design manner, a residual gated signal in the first branch signal and the second branch signal and an electrical spike noise brought by the gated signal can be effectively eliminated, thereby improving quality of the photon information, and improving accuracy of a single-photon detection apparatus.

In an optional implementation, the input signal may be obtained by coupling a gated signal and a bias voltage signal.

In some embodiments, a gated signal that passes through a third capacitor and a bias voltage signal that passes through a first inductor are coupled to form an input signal. The input signal is divided into two input signals. After one input signal passes through the phase-reversed reflection branch, a phase-reversed signal is output. After the phase-reversed signal passes through the single-photon sensing device, the first branch signal is obtained. The other input signal passes through the single-photon sensing device, and then enters the phase-unreversed reflection branch. The phase-unreversed reflection branch outputs the second branch signal. In some embodiments, because the input signal is a signal obtained through coupling processing, difficulty in matching impedance of the first branch circuit and impedance of the second branch circuit can be reduced.

In another optional implementation, the input signal is a gated signal.

In some embodiments, the input signal may be input into the phase-reversed reflection branch that includes the short-circuit resistor, to obtain the phase-reversed signal. The other input signal that passes through the third capacitor and the single-photon sensing device and the bias voltage signal that acts on the single-photon sensing device are superimposed, and then a signal obtained through superimposition enters the phase-unreversed reflection branch. The phase-unreversed reflection branch outputs the second branch signal. Alternatively, the other input signal that passes through the third capacitor and the bias voltage signal are superimposed, and then signals obtained through superimposition sequentially enter the single-photon sensing device and the phase-unreversed reflection branch. The phase-unreversed reflection branch outputs the second branch signal.

In some embodiments, input signals including the gated signals are divided into two input signals. After one input signal passes through the phase-reversed reflection branch, the phase-reversed signal is output. The phase-reversed signal that passes through the third capacitor and the single-photon sensing device and the bias voltage signal that acts on the single-photon sensing device form the first branch signal. The other input signal that passes through the third capacitor and the single-photon sensing device and the bias voltage signal that acts on the single-photon sensing device are superimposed, and then a signal obtained through superimposition enters the phase-unreversed reflection branch. The phase-unreversed reflection branch outputs the second branch signal. Alternatively, input signals including the gated signals are divided into two input signals. After one input signal passes through the phase-reversed reflection branch, the phase-reversed signal is output. The phase-reversed signal that passes through the third capacitor and the bias voltage signal are superimposed, and then a signal obtained through superimposition enters the single-photon sensing device. The single-photon sensing device outputs the first branch signal. The other input signal that passes through the third capacitor and the bias voltage signal are superimposed, and then signals obtained through superimposition sequentially enter the single-photon sensing device and the phase-unreversed reflection branch. The phase-unreversed reflection branch outputs the second branch signal.

For example, the bias voltage signal is used to control the single-photon sensing device to be in a critical breakdown state.

In some embodiments, the bias voltage signal is used to control the single-photon sensing device to be in the critical breakdown state, so that the single-photon sensing device can sensitively respond to the gated signal. When the gated signal is superimposed with the bias voltage signal, the single-photon sensing device may be in an avalanche state in a time window of the gated signal. When there is a photon in the time window of the gated signal, the single-photon sensing device in the avalanche state can respond to the photon and generate the photon information.

For example, a period of time in which the input signal is sent from an input end to the output end is one-half ($\frac{1}{2}$) of a period duration of the gated signal.

In some embodiments, the period of time in which the input signal is sent from the input end to the output end may be set to be one-half ($\frac{1}{2}$) of the period duration of the gated signal. In this manner, the time window of the gated signal can be fully used, so that photon counting can be completed in the time window of the gated signal, and miscount can be avoided.

For example, when the bias voltage signal acts on a cathode of the single-photon sensing device, the bias voltage signal is a positive bias voltage signal, and the gated signal is a negative pulse signal; or when the bias voltage signal acts on an anode of the single-photon sensing device, the bias voltage signal is a negative bias voltage signal, and the gated signal is a positive pulse signal.

In some embodiments, when the input gated signal is a negative pulse signal, the bias voltage signal is a positive bias voltage signal, and the positive bias voltage signal acts on the cathode of the single-photon sensing device, so that an input signal on which a phase-reversed reflection processing is not performed does not trigger the single-photon sensing device to be in the avalanche state, and only an input signal on which a phase-reversed reflection processing is performed triggers the single-photon sensing device to be in the avalanche state. Therefore, in the gate time window, only one of the two pulses enables the single-photon detector to be in the photon detection state. This suppresses generation of the afterpulse, reduces the quantity of dark counts, and improves the sensitivity of the single-photon detector.

For example, the gated signal includes a square wave signal, a sine signal, and a cosine signal.

Similarly, when the input gated signal is a positive pulse signal, the bias voltage signal is a negative bias voltage signal, and the negative bias voltage signal acts on the anode of the single-photon sensing device 22, so that the input signal on which a phase-reversed reflection processing is not performed does not trigger the single-photon sensing device to be in the avalanche state, and only the input signal on which a phase-reversed reflection processing is performed triggers the single-photon sensing device to be in the avalanche state. Therefore, in the gate time window, only one of the two pulses enables the single-photon detector to be in the photon detection state. This suppresses generation of the afterpulse, reduces the quantity of dark counts, and improves the sensitivity of the single-photon detector.

In some embodiments, each periodic signal such as the square wave signal, the sine signal, or the cosine signal can be used as a gated signal, to trigger the single-photon sensing device to respond to the photon in the gate time window of the gated signal, to obtain the photon information.

The single-photon detection method provided in these embodiments may be applied to the single-photon detection apparatuses shown in FIG. 2 to FIG. 5. For an implementation principle and implementation process of the single-photon detection method, refer to descriptions of related content in FIG. 2 to FIG. 5. Details are not described herein again.

An embodiment of this application provides a chip, including a memory and a processor. The memory is configured to store a program instruction, and the processor is configured to invoke the program instruction in the memory, to perform the single-photon detection method shown in FIG. 9.

It should be noted that the apparatus in the embodiments of this application may also be divided into a plurality of modules based on functions of the apparatus. Division into the modules is an example, and is merely logical function division. In an actual implementation, there may be another division manner. Functional modules in the embodiments of this application may be integrated into one processing module, or each of the modules may exist alone physically, or two or more modules are integrated into one module.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A single-photon detection apparatus comprising a phase-reversed reflection branch, a single-photon sensing device, and a phase-unreversed reflection branch, wherein the single-photon detection apparatus is configured to receive an input signal divided into a first input signal that is received at the phase-reversed reflection branch and a second input signal that is received at the single-photon sensing device;
the phase-reversed reflection branch is configured to:
perform phase-reversed reflection processing on the first input signal, to obtain a phase-reversed signal, and send the phase-reversed signal to the single-photon sensing device;
the single-photon sensing device is configured to send the second input signal to the phase-unreversed reflection branch, and is further configured to: sense a photon, generate photon information, and output a first branch signal, wherein the first branch signal comprises the photon information and the phase-reversed signal;
the phase-unreversed reflection branch is configured to perform phase-unreversed reflection processing on the second input signal, to obtain a second branch signal; and
the first branch signal is superimposed with the second branch signal, to obtain the photon information.

2. The apparatus according to claim 1, wherein the first branch signal and the second branch signal arrive at an output end at a same time.

3. The apparatus according to claim 1, wherein the phase-reversed reflection branch comprises a short-circuit resistor and a first capacitor, and the first input signal sequentially passes through the first capacitor and the short-circuit resistor, to generate the phase-reversed signal through reflection.

4. The apparatus according to claim 1, wherein the phase-unreversed reflection branch comprises an open-circuit resistor and a second capacitor, and after the second input signal passes through the second capacitor and the open-circuit resistor sequentially, the second branch signal is generated through reflection.

5. The apparatus according to claim 1, wherein the input signal is obtained by coupling a gated signal and a bias voltage signal.

6. The apparatus according to claim 5, wherein the apparatus further comprises a third capacitor and a first inductor, a first end of the third capacitor is configured to receive the gated signal, a second end of the third capacitor is separately connected to an end of the phase-reversed reflection branch, a first end of the first inductor, and an end of the single-photon sensing device, and a second end of the first inductor is configured to receive the bias voltage signal.

7. The apparatus according to claim 1, wherein the input signal is a gated signal.

8. The apparatus according to claim 7, wherein the phase-reversed reflection branch comprises a short-circuit resistor, and the first input signal passes through the short-circuit resistor, to generate the phase-reversed signal through reflection.

9. The apparatus according to claim 7, wherein the phase-unreversed reflection branch comprises an open-circuit resistor and a second capacitor, and the second input signal passes through the second capacitor and the open-circuit resistor sequentially, to generate the second branch signal through reflection.

10. The apparatus according to claim 7, wherein the apparatus further comprises a third capacitor and a first inductor, a first end of the third capacitor is configured to receive the phase-reversed signal and the gated signal, a second end of the third capacitor is connected to the single-photon sensing device, a first end of the first inductor is connected to the single-photon sensing device, and a second end of the first inductor is configured to receive a bias voltage signal.

11. The apparatus according to claim 5, wherein the bias voltage signal controls the single-photon sensing device to be in a critical breakdown state.

12. The apparatus according to claim 5, wherein a period of time in which the input signal is sent from an input end to the output end is ½ of a period duration of the gated signal.

13. The apparatus according to claim 5, wherein
when the bias voltage signal acts on a cathode of the single-photon sensing device, the bias voltage signal is a positive bias voltage signal, and the gated signal is a negative pulse signal; or
when the bias voltage signal acts on an anode of the single-photon sensing device, the bias voltage signal is a negative bias voltage signal, and the gated signal is a positive pulse signal.

14. A single-photon detection method, wherein the method comprises:
dividing an input signal into a first input signal and a second input signal;
performing phase-reversed reflection processing on the first input signal, to obtain a phase-reversed signal;
sensing a photon, generating photon information, and outputting a first branch signal, wherein the first branch signal comprises the photon information and the phase-reversed signal;
performing phase-unreversed reflection processing on the second input signal, to obtain a second branch signal; and
superimposing the first branch signal and the second branch signal, to obtain the photon information.

15. The method according to claim 14, wherein the first branch signal and the second branch signal arrive at an output end at a same time.

16. The method according to claim 14, wherein the performing phase-reversed reflection processing on the first input signal, to obtain the phase-reversed signal comprises:
inputting the first input signal into a phase-reversed reflection branch that comprises a first capacitor and a short-circuit resistor, to obtain the phase-reversed signal.

17. The method according to claim 16, wherein the performing phase-unreversed reflection processing on the second input signal, to obtain the second branch signal comprises:
inputting, into a phase-unreversed reflection branch that comprises a second capacitor and an open-circuit resistor, the second input signal that passes through a single-photon sensing device, to generate the second branch signal through reflection.

18. The method according to claim 14, wherein the input signal is obtained by coupling a gated signal and a bias voltage signal.

19. The method according to claim 18, wherein a period of time in which the input signal is sent from an input end to the output end is ½ of a period duration of the gated signal.

20. The method according to claim 18, wherein
when the bias voltage signal acts on a cathode of the single-photon sensing device, the bias voltage signal is a positive bias voltage signal, and the gated signal is a negative pulse signal; or
when the bias voltage signal acts on an anode of the single-photon sensing device, the bias voltage signal is a negative bias voltage signal, and the gated signal is a positive pulse signal.

* * * * *